United States Patent [19]

Matulich et al.

[11] 4,194,357
[45] Mar. 25, 1980

[54] AUTO IGNITION TEMPERATURE CONTROL SYSTEM

[75] Inventors: Dan S. Matulich, Rolling Hills Estates, Calif.; B. Franklin Saylor, Phoenix, Ariz.

[73] Assignee: The Garrett Corporation, Los Angeles, Calif.

[21] Appl. No.: 886,388

[22] Filed: Mar. 14, 1978

Related U.S. Application Data

[62] Division of Ser. No. 704,903, Jul. 13, 1976, Pat. No. 4,102,387.

[51] Int. Cl.$^2$ ............................................. F28F 27/00
[52] U.S. Cl. .................................. 60/39.02; 60/39.07; 165/1; 165/37; 236/80 A
[58] Field of Search ...................... 60/39.02, 39.07; 98/1.5; 165/1, 35, 36, 37, 38; 236/13, 80 A, 80 C; 62/DIG. 5

[56] References Cited

U.S. PATENT DOCUMENTS

| 2,966,308 | 12/1960 | Jensen | 236/13 |
| 3,122,318 | 2/1964 | Null | 236/87 |
| 4,114,808 | 9/1978 | Saylor | 236/87 |

*Primary Examiner*—Louis J. Casaregola
*Attorney, Agent, or Firm*—Joel D. Talcott; Albert J. Miller

[57] ABSTRACT

A temperature control system safely and efficiently protects critical aircraft surfaces from reaching fuel auto ignition temperature with cooling provided by a relatively small and light heat exchanger.

6 Claims, 4 Drawing Figures

AUTO IGNITION TEMPERATURE CONTROL SYSTEM

This is a divisional of application Ser. No. 704,903 filed July 13, 1976 now U.S. Pat. No. 4,102,387, issued July 25, 1978.

This invention relates to thermal control systems for aircraft and, more particularly, to a thermal control system for cooling bleed air from a gas turbine engine which utilizes a heat exchanger much smaller than that found in the prior art and yet safely maintains the air in the bleed air ducts at a temperature lower than that might produce auto-ignition of aircraft fuel proximate to the ducts. Air temperature limiting along a schedule closely approaching the auto ignition temperature permits maximum energy to be available in the temperature controlled air.

When bleed air from a gas turbine engine is used to power air cycle air conditioning systems as is done in many conventional aircraft, it is generally desirable to precondition the bleed air so that it will exhibit suitable pressure and temperature characteristics for use in the air conditioning system. In some aircraft, such as military fighter planes, a further problem exists in that the air flowing to the air conditioning system will pass sufficiently close to fuel storage areas that heat conduction from the air could subject fuel vapors to temperatures in excess of the auto ignition temperature of the fuel thus making an ignition possible.

Prior art preconditioning systems generally use a heat exchanger which is thermostatically controlled, often through a conventional mixing valve, to maintain a suitable temperature for the bleed air. Pressure is generally controlled by conventional pressure regulators. To assure that the temperature of the air will not cause auto ignition problems, the heat exchanger is generally sufficiently large and massive so that it has the capacity to adequately cool the air to a safe temperature, even under conditions of high thermal load which may occur when the aircraft is taking off, climbing or in any high speed, high power operating mode. Safety backup for this system, if used at all, generally consists of a thermostat coupled to the pressure regulator to turn off the flow of bleed air if the temperature reaches a preset level.

While these prior art systems are generally adequate to provide the desired preconditioning, the use of such systems makes it necessary for the airplane to carry a heat exchanger which is larger and heavier. This is highly undesirable in any aircraft and is more particularly intolerable in a military fighter airplane. Further, the only available backup systems provide complete shutdown of the bleed air supply required to operate aircraft air conditioning. While on a twin engine airplane, air conditioning may be then supplied by the other engine, similar problems may cause simultaneous shutdown removing all air conditioning from the environmental areas and avionics of the airplane.

In accordance with this invention, a bleed air preconditioning system is utilized which preconditions the air in the desired manner with a substantially smaller and lighter heat exchanger without sacrificing safety of the aircraft. A first thermostat controls bleed air temperature during normal operation so that the desired thermal characteristics of the bleed air to be supplied to the air conditioning systems can be achieved. Under operating conditions which cause the temperature of the bleed air to exceed the capacity of the heat exchanger to maintain the desired temperature, a second thermostat, triggered at a predetermined higher temperature than the first thermostat, controls a valve upstream of the heat exchanger to limit flow of air to the heat exchanger to an amount which is within the capacity of the heat exchanger to cool to the desired safe temperature.

While this decreased flow of air might otherwise temporarily inhibit operation of the air conditioning systems of the aircraft, it permits the aircraft to fly safely through the transient high speed or "off design" condition. The second thermostat is pressure biased so that its temperature response characteristics are altered with changes in altitude to match the ignition characteristics which vary as a function of air density. This enables the system to raise the permissible temperature of the air at higher altitudes where the auto ignition temperature of the fuel is higher.

The improved system of this invention satisfies normal operating conditions and does not penalize the aircraft with excess weight in order to meet certain steady state performance objectives during transient or "off design" aircraft operating conditions.

The advantages of the control system of this invention will be more readily apparent when the following specification is read in conjunction with the appended drawings, wherein.

Figure 1:
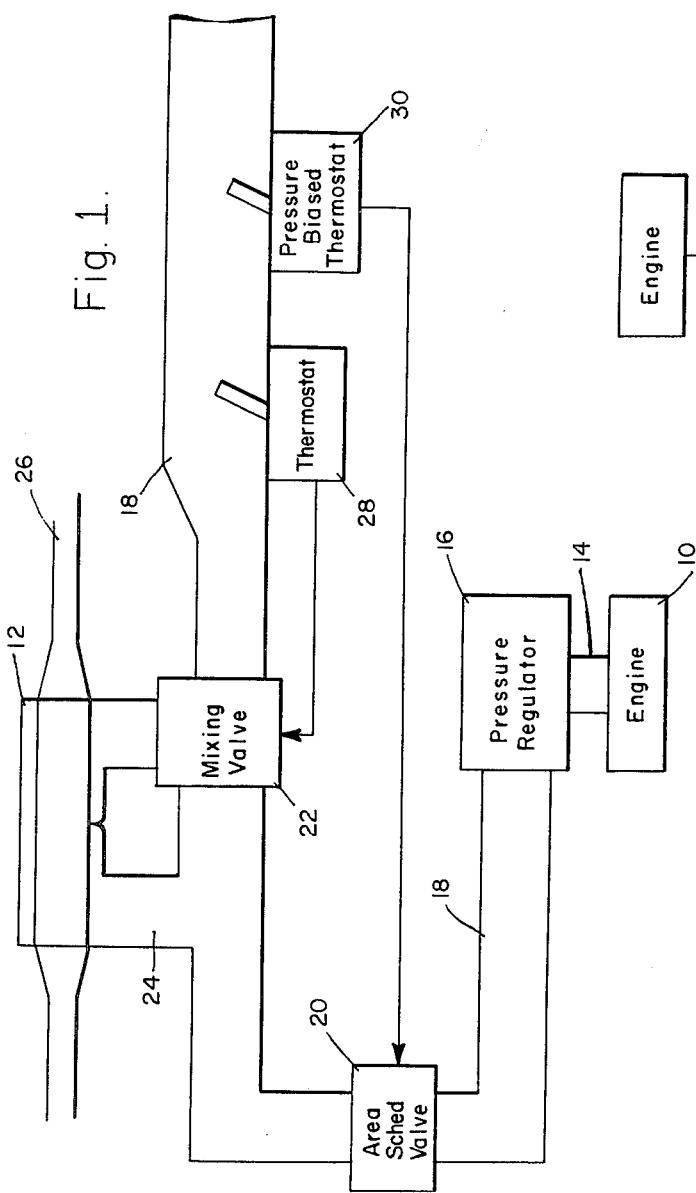
FIG. 1 is a block diagram of the control system of this invention.

Referring now to the drawings, FIG. 1 is illustrative of the novel system of this invention for preconditioning bleed air from a gas turbine engine 10 and controlling the temperature of the bleed air through the use of a heat exchanger 12 of relatively small size and weight such that the auto ignition temperature of fuel is never exceeded at critical surfaces even under operating conditions exhibiting high thermal loads.

Bleed air from the engine 10 flows through a duct 14 to a conventional high temperature pressure regulator 16 which limits pressure of the bleed air flowing through duct 18 to a predetermined level.

Interposed in the duct 18 are an area schedule valve 20 for limiting flow through the duct 18 in a manner to be described and a mixing valve 22 which selectively and proportionally blocks or opens the duct 18 and a bypass duct 24. The bypass duct 24 leads bleed air through the heat exchanger 12 for cooling. Thus, mixing valve 22 controls the temperature of bleed air continuing through the duct 18 to the air conditioning equipment (not shown) downstream. The heat exchanger 12 is preferably cooled by ram air passing through a duct 26.

Downstream of the mixing valve 22 in the duct 18 are a thermostat 28 and a pressure biased thermostat 30. The thermostat 28 is operably coupled to the mixing valve 22 for controlling the flow of air through the heat exchanger 12. The pressure biased thermostat 30 is operably coupled to the area schedule valve 20 for controlling the total flow through the duct 18.

Under normal operating conditions, the thermostat 28, mixing valve 22 and heat exchanger 12 function to control the temperature of air flow to downstream air conditioning equipment while the pressure of this air flow is regulated by the pressure regulator 16. During this operating mode, the area schedule valve 20 is fully open and in no way impedes or controls airflow through the duct 18.

The thermostat 28 may be calibrated to respond to any desired temperature, typically about 250°–350° F. If air flow through the duct 18 is below this temperature, the mixing valve 22 adjusts to decrease flow through the bypass duct 24 and increase the air flow remaining in the duct 18. Should temperature in the duct 18 surpass the preset temperature, the mixing valve begins to close the path through the duct 18 while opening the path through the bypass duct 24 so that a greater portion of the air is cooled and the temperature of the air downstream of the mixing valve 22 is decreased. In this manner, downstream air temperature can generally be controlled and maintained at the preset temperature.

However, during certain operating conditions such as takeoff, climb and dash, wherein the engine is operating in a high power mode and high speed may cause a significant increase in the temperature of the ram air fed through the duct 26 as well as the bleed air, the heat exchanger 12 may be unable to cool the air flowing through the duct 18 to the desired temperature. Under such circumstances, the temperature of the air flowing past the thermostat 28 and pressure biased thermostat 30 will continue to increase even through the thermostat 28 has caused the mixing valve 22 to assume a configuration wherein flow through the duct 18 is fully blocked and all air flow is through the bypass duct 24 and heat exchanger 12.

Figure 3:
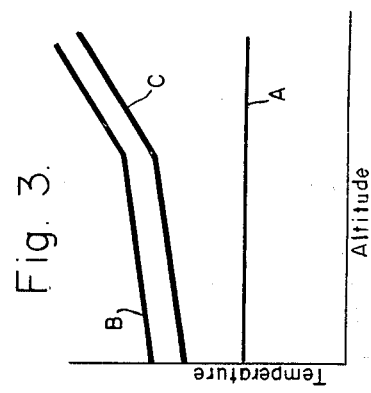
FIG. 3 is a graph of temperature v. altitude illustrating functional relationships relevant to this invention.

Prior art systems have avoided this problem by making the heat exchanger sufficiently large so that it has the capacity to sufficiently cool the air under all circumstances short of malfunction. However, they have had to pay a significant weight penalty. These prior art systems used a large heat exchanger to establish an absolute maximum temperature above which the air in the duct 18 will not pass regardless of conditions. This temperature, represented by curve A in the temperature altitude graph of FIG. 3, is significantly below the auto ignition temperature represented by curve B. It should be noted that during operation, the temperature of the air in the duct may be lower than that shown by the curve but is never permitted to become higher than that temperature.

In the present invention, exemplified by the system of FIG. 1, an upper temperature limit is established for the air in the duct 18 in accordance with curve C which closely approximates the auto ignition temperature curve B while remaining safely below it. This curve is established by operation of the pressure biased thermostat 30 and the area schedule valve 20.

The pressure biased thermostat is set to be activated at a temperature significantly higher than the operating temperature of the thermostat 28. For example, the thermostat 28 may be set to maintain the temperature in the duct 18 at about 250° F. while the thermostat 30 may be set to respond, at sea level, at a temperature of about 450° F. Thus, as previously indicated, prior to action of the pressure biased thermostat 30 and area schedule valve 20, the mixing valve 22 will have been positioned such that all air flows through the bypass duct 24 and the heat exchanger 12. The circumstances under which this situation will occur are generally limited to takeoff, climb and dash operational modes.

Under normal operating conditions, the mixing valve 22 in conjunction with the heat exchanger 12 are fully capable of maintaining air in the duct 18 within the acceptable range, as shown by curve C of FIG. 3.

As the temperature in the duct 18 reaches the preset temperature which activates the pressure biased thermostat 30, this thermostat causes the area schedule valve 20 to begin closing off flow through the duct 18. Such action diminishes the amount of air flowing through the heat exchanger 12. Because the ability of the heat exchanger 12 to remove heat has not changed, the decrease in the quantity of hot bleed air passing through the heat exchanger 12 enables the heat exchanger to lower the temperature of the air passing therethrough to be lowered by a greater amount so that air temperature in the duct 18 is reduced to the magnitude required by the pressure biased thermostat 30. If the predetermined temperature is not reached, the area schedule valve 20 will continue to close until air flow through the duct 18 is completely terminated. In either event, high temperature flow in the vicinity of fuel tanks which might result in auto ignition of fuel vapors is prevented.

As will be more fully described herein, the response temperature of the pressure biased thermostat 30 alters with changes in pressure so that, as the altitude of the airplane increases, the temperature set point of the thermostat may be increased. By properly designing the thermostat, it may be given temperature response characteristics such that the curve C of FIG. 3 may be established as an upper temperature limit for air in the duct 18. By causing the temperature of the air to be as close as possible to the highest permissible temperature, loss of performance which might result from the decrease in flow produced by the area schedule valve 20 may be prevented. Although the area schedule valve reduces the amount of flow which will be available to operate the turbo-compressor of an air cycle air conditioning system, the higher temperature of this air will provide the highest possible energy level for operating the equipment so that any reduction in air conditioning performance will be minimized. The valve 20 has a proportional control characteristic which assures proper flow sharing while flow is being reduced in circumstances where a pair of systems are used for twin engines of an aircraft and their outputs coupled downstream.

Figure 2:
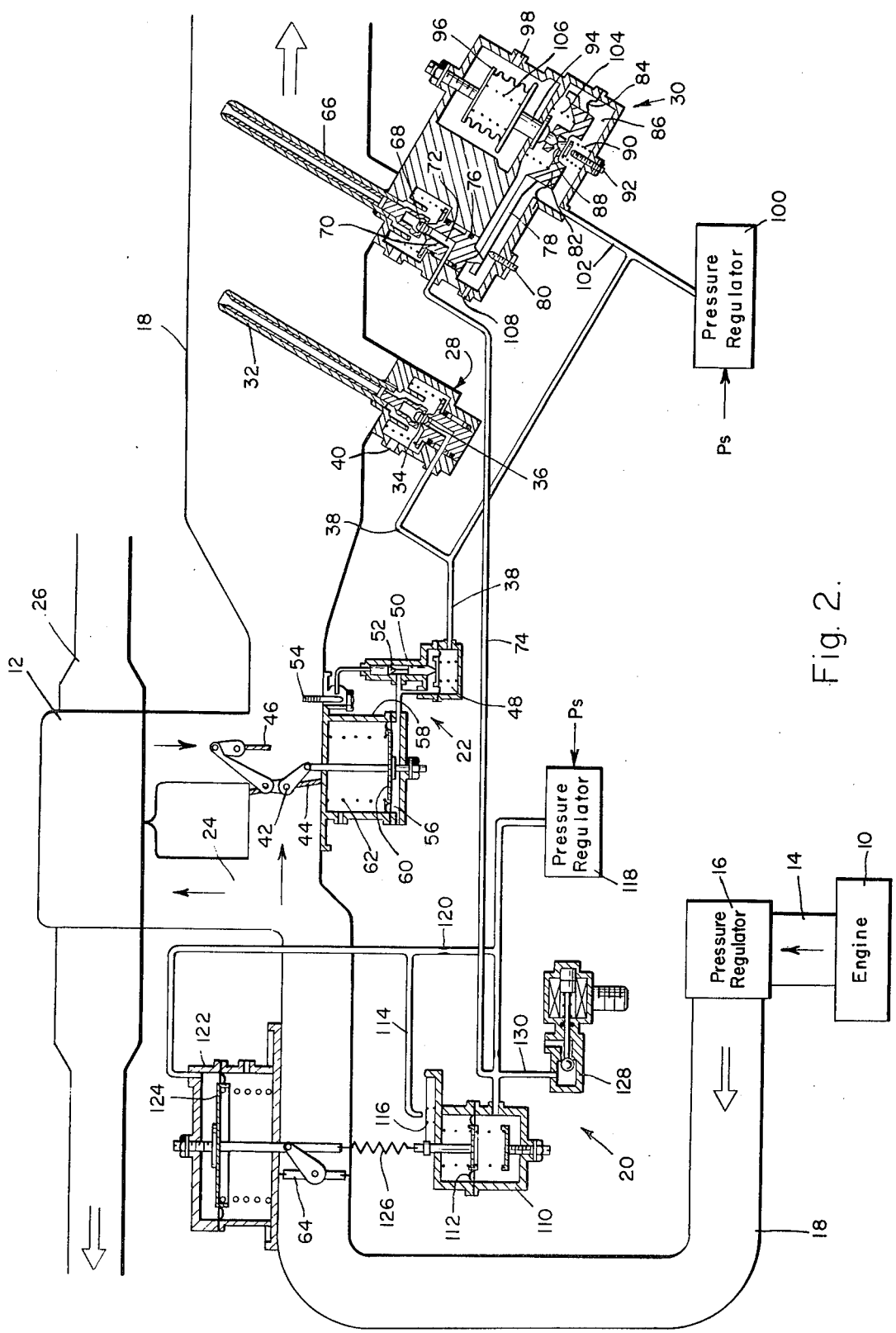
FIG. 2 is a generally schematic view of the control system of FIG. 1.

The control system of this invention is further illustrated in FIG. 2 wherein the area schedule valve 20, the mixing valve 22, the thermostat 28 and the pressure biased thermostat 30 are schematically illustrated. The thermostat 28 is preferably a conventional pneumatic thermostat having a bimetal tube 32 extending into the duct 18. Thermal response of the bimetal tube unseats a thermostat ball 34 from a valve seat 36 bleeding air from a tube 38 to ambient through a vent 40. While the temperature in the duct 18 is below the response temperature of the thermostat 28, the pressure in the tube 38 is maintained at a predetermined controlled level. As the temperature becomes greater than that value, operation of the thermostat bleeds air from the tube 38, decreasing the pressure therein.

The tube 38 communicates with the mixing valve 22 which includes linkage 42 for controlling a pair of butterflies 44 and 46. The butterfly 46 controls air flow through the bypass duct 24 and heat exchanger 12 while the butterfly 44 controls the flow of the remainder of the air through the duct 18. The linkage 42 controls the butterflies such that the butterfly 44 is fully closed when the butterfly 46 is fully opened, the butterfly 46 closes while the butterfly 44 opens at substantially proportional flow rates, and the butterfly 44 is fully opened when the butterfly 46 is fully closed. Thus, the flow of uncooled air through the duct 18 can be mixed with the flow of cooled air through the duct 24 and heat exchanger 12 to control downstream air temperature.

When the temperature in the duct 18 is below the operating temperature of the thermostat 28, the pressure in the tube 38 is maintained at its uppermost level. This maintains a raised pressure level in chamber 48 of a thermostat reset pressure regulator 50. This pressure holds open a poppet metering assembly 52 so that pressurized air can flow from the duct 18 through a filter 54 and the thermostat reset pressure regulator 50 into chamber 56 of an actuator 58. The pressure in the chamber 56 pushes a diaphragm 60 against the force of a spring 62 and moves the butterfly 44 to its full open position and the butterfly 46 to its fully closed position. In this configuration, no air flows through the heat exchanger 12.

Upon an increase in temperature above the response level of the thermostat 28, action of the bimetal tube 32 unseats the thermostat ball 34 from the valve seat 36 and causes the pressure in the tube 38 and, accordingly, the chamber 48 to decrease. This closes the poppet metering assembly 52 permitting the pressure in the chamber 56 to bleed to ambient, reaching the same pressure as the chamber 48, so that the spring 62 overcomes this pressure and moves the diaphragm 60. The butterfly 44 begins to close and butterfly 46 begins to open, cooling the bleed air through the heat exchanger 12. As will be readily understood by those skilled in the art, the feedback loop consisting of the thermostat 28 and mixing valve 22 will cause the butterflies 44 and 46 to assume interim positions whereby the temperature in the duct 18 is maintained at about the preset response temperature of the thermostat 28.

As long as the heat exchanger 12, in conjunction with the mixing valve 22, is able to maintain the temperature of air in the duct 18 at this level, the pressure biased thermostat 30 and area schedule valve 20 will remain in a configuration wherein a butterfly 64 of the area schedule valve 20 is in its fully open condition permitting maximum air flow through the duct 18. However, should the temperature in the duct 18 rise significantly above that called for by the thermostat 28, thermal control will be maintained by the pressure biased thermostat 30.

The pressure biased thermostat 30 is more fully described in U.S. Pat. No. 4,114,808, issued Sept. 19, 1978 in the name of B. Franklin Saylor, and has thermal sensing components substantially similar to those of the thermostat 28. A bimetal tube 66 controls the position of a thermostat ball 68 relative to a valve seat 70, selectively sealing and opening a channel 72 in the valve seat. In this thermostat, the valve seat 70 is movable toward and away from the bimetal tube 66 in a manner to be described and the channel 72 communicates with a tube 74 for controlling pressure therein, sealed by a pair of O-ring seals 76.

The movable valve seat 70 is connected by a lever arm 78 through a fulcrum screw 80 to a valve seat 82 which is mounted in a diaphragm 84 to form a chamber 86.

A bleed off poppet valve 88 is held in the valve seat 82 by a spring 90 which in turn is positioned around an adjustable stop 92. The poppet valve 88 engages an extended end of a drive post 94 of an aneroid bellows assembly 96. The aneroid bellows assembly is connected to ambient pressure by a vent 98. The chamber 86 is pressurized by air flow from a regulator 100 through a tube 102.

In operation, when the thermostat is positioned at sea level so that the aneroid bellows assembly 96 is subjected to relatively high pressure, the bellows is collapsed and the diaphragm 84 is urged by the pressure in the chamber 86 overcoming the force of a spring 104 so that the lever arm pivoting around the fulcrum screw 80 holds the valve seat 70 in a position furthest away from the bimetal tube 66. In this position the thermostat ball 68 will be moved from its position blocking the channel 72 at the lowest possible temperature.

As the altitude of the thermostat is increased so that the ambient pressure decreases, the aneroid bellows assembly expands under the force of a spring 106. This removes the bleed off poppet valve 88 from the valve seat 82 and permits pressure to bleed from the chamber 86 to ambient through a vent 108. The valve seat 82 is thereupon urged against the poppet valve 88 by the spring 104. The chamber 86 then pressurizes and the valve seat 82 maintains a position where the forces applied thereto are balanced.

This motion of the valve seat 82 is applied through the lever arm 78 to the movable valve seat 70 which is moved thereby in a direction closer to the bimetal tube 66 so that a higher temperature must be reached before the thermostat bell 68 is removed from the valve seat permitting flow from the tube 74. By the use of this pressure biased thermostat 30, a temperature response characteristic which increases with altitude in the manner shown by curve C of FIG. 3 may readily be obtained for the thermostat.

The pressure controlled by the pressure biased thermostat 30 is applied through the tube 74 to a control servo 110 of the area schedule valve 20. When this pressure is high, as at a temperature in duct 18 less than the response temperature of the thermostat 30, a diaphragm 112 is urged upwardly so that a control nozzle 114 is held closed by a closing member 116.

With the control nozzle 114 closed, pressure from a regulator 118 is applied through an orifice 120 to a butterfly actuator 122 where it biases a diaphragm 124 to hold the butterfly 64 in its fully open position.

If temperature in the duct 18 surpasses the response temperature of the thermostat 30, the pressure applied to the control servo 110 through the tube 74 drops and motion of the diaphragm 112 in response thereto moves the closing member 116 away from the control nozzle 114. Flow from the nozzle 114 reduces the pressure in the butterfly actuator 122. Upward motion of the diaphragm 124 then begins to close the butterfly 64 and is terminated when this motion, communicated through an extension spring 126 moves the closing member 116 against the control nozzle 114 which terminates flow therefrom and permits the butterfly actuator 122 to be repressurized. Accordingly, the area schedule valve translates changes in pressure in the tube 74 into positional changes of the butterfly 64 in a manner well known to those skilled in the art.

If desired, the area schedule valve 20 may be fully closed manually by use of a solenoid 128. When activated, the solenoid 128, through a tube 130, vents the control servo 110 to ambient. In the same manner previously described, this removes pressure from the butterfly actuator 122 and causes motion of the diaphragm 124 to fully close the butterfly 64. The solenoid 128 may be used, if desired, as a manual backup or emergency shut off for the system.

By use of these interrelated components, a feedback loop is established between the pressure biased thermostat 30 and the area schedule valve 20 such that, when temperature in the duct 18 approaches a temperature which might otherwise create a danger of auto ignition of fuel vapors in adjacent portions of the aircraft, operation of the pressure biased thermostat 30 begins to close the butterfly 64 of the area schedule valve 20 so that the flow of air through the heat exchanger 12 is limited to that which may be cooled to the preset temperature. The temperature established by the thermostat changes in accordance with a predetermined schedule to closely approximate the auto ignition temperature schedule for the airplane. If the thermal loads in the system are such that the heat exchanger is entirely unable to accommodate any air flow while maintaining safe temperatures, the pressure biased thermostat 30 automatically closes the butterfly 64 to terminate flow through the duct 18.

Figure 4:
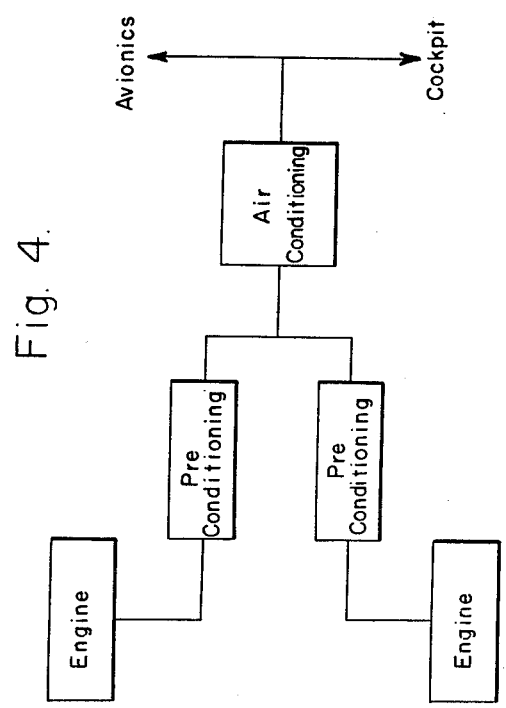
FIG. 4 is a block diagram showing the control system of this invention applied to a twin engine airplane.

FIG. 4 illustrates schematically a twin engine system wherein bleed air from each engine is passed through a preconditioning system such as that illustrated in FIGS. 1 and 2 and then joined at a junction subsequent to which the air is cooled in an air conditioning system and fed to the avionics and to the cockpit. It should be noted that the control system of this invention permits the coupling of these bleed flows and their independent control without difficulty. Use of the preconditioning systems of this invention provides the proper safety control and suitable backups during temperature and pressure preconditioning of the bleed air from each engine without pressure surges and flow alternation which might otherwise produce operation difficulties.

We claim:

1. An auto-ignition temperature control system for holding surfaces adjacent fuel vapors to temperatures below a predetermined schedule, said system comprising:
   means for thermal conditioning turbine engine bleed air;
   first thermostat means for controlling said thermal conditioning means;
   valve means for limiting flow of bleed air through said thermal conditioning means;
   second thermostat means for controlling said valve means to limit output of said thermal conditioning means to a threshold temperature; and
   pressure responsive means for varying said threshold temperature with altitude to approximate said predetermined schedule.

2. An auto-ignition temperature control system as in Claim 1 and including means for closing said valve means to terminate flow of bleed air through said thermal conditioning means.

3. A system for conditioning bleed air from a turbine engine, said system comprising:
   means for receiving bleed air from a turbine engine and controlling its pressure to a desired level;
   first valve means for receiving bleed air from said pressure controlling means and controlling the rate of flow thereof;
   heat exchanger means for cooling bleed air passing therethrough;
   first duct means for carrying bleed air from said first valve means through said heat exchanger;
   second duct means for carrying bleed air from first valve means past said heat exchanger;
   second valve means for controlling relative flow of bleed air through said first and second duct means;
   first thermostat means for controlling operation of said first valve means; and,
   second thermostat means for controlling operation of said second valve means.

4. A method of preconditioning an auto-ignition temperature control for turbine engine bleed air, said method comprising the steps of:
   cooling bleed air by passing a portion thereof through a heat exchanger;
   increasing the portion flowing through said heat exchanger with increased thermal load;
   upon maximum flow through said heat exchanger, sensing increase in bleed air temperature to a threshold level; and
   limiting flow of bleed air to a rate which can be cooled by said heat exchanger to said threshold level.

5. A method as in claim 4 including the additional step of altering said threshold level with changes in altitude.

6. A system for conditioning bleed air from a pair of aircraft gas turbine engines, said system comprising:
   means for receiving bleed air from a first of said turbine engines and controlling its pressure to a desired level;
   first valve means for receiving bleed air from said first turbine engine pressure controlling means and controlling the rate of flow thereof;
   first heat exchanger means for cooling first engine bleed air passing therethrough;
   second valve means for controlling relative flow of bleed air through and past said heat exchanger;
   thermostat means for controlling operation of said first and second valve means;
   means for receiving bleed air from a second of said turbine engines and controlling its pressure to a desired level;
   third valve means for receiving first engine bleed air from said pressure controlling means and controlling the rate of flow thereof;
   second heat exchanger means for cooling second engine bleed air passing therethrough;
   fourth valve means for controlling relative flow of second engine bleed air through and past said heat exchanger;
   thermostat means for controlling operation of said third and fourth valve means; and
   means for combining bleed air flow from said second and fourth valve means.

* * * * *